United States Patent

Frank

[15] 3,695,232

[45] Oct. 3, 1972

[54] POULTRY CRATES

[72] Inventor: William C. Frank, Hyde Park, Ontario, Canada

[73] Assignee: Hyde Park Farm Supply Limited, Hyde Park, Ontario, Canada

[22] Filed: March 13, 1970

[21] Appl. No.: 19,166

[52] U.S. Cl. ................................................119/17
[51] Int. Cl. ...........................................A01k 31/06
[58] Field of Search ............119/17, 18, 19; 220/6, 7; 108/111

[56] References Cited

UNITED STATES PATENTS

| | | |
|---|---|---|
| 2,026,417 | 12/1935 | Conway et al. ............119/19 |
| 1,644,472 | 10/1927 | Hatch ....................119/17 X |
| 1,010,036 | 11/1911 | Foltz.........................108/111 |
| 1,347,397 | 7/1920 | Newman.....................119/17 |
| 399,241 | 3/1889 | Burns ..........................119/2 |

*Primary Examiner*—Hugh R. Chamblee
*Attorney*—W. Irwin Haskett

[57] ABSTRACT

A unit consisting of one or more stacks of poultry cages for facilitating large volume in-and-out movements of poultry, suitable for loading on and unloading from a truck trailer by a power lift carried by the vehicle and for travel to and from the vehicle and along the aisles of a poultry house on a separable wheeled dolly, wherein access to each individual cage in a stack is afforded through the top at one end by way of an upwardly hinged lid, the cage interiors being accessible successively from bottom to top for filling and from top to bottom for emptying.

3 Claims, 5 Drawing Figures

PATENTED OCT 3 1972  3,695,232
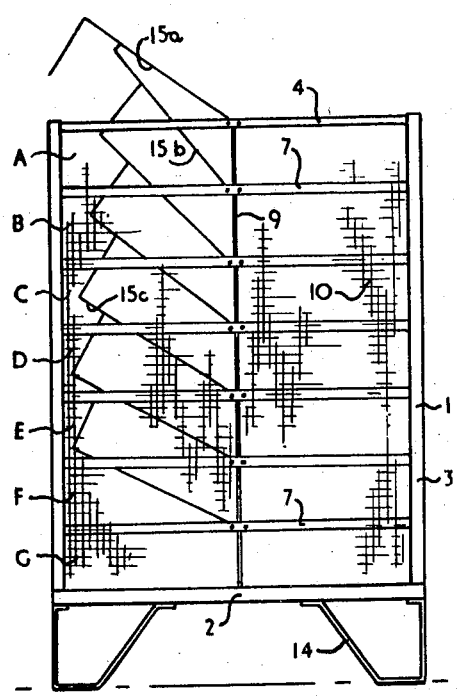
FIG. 1.
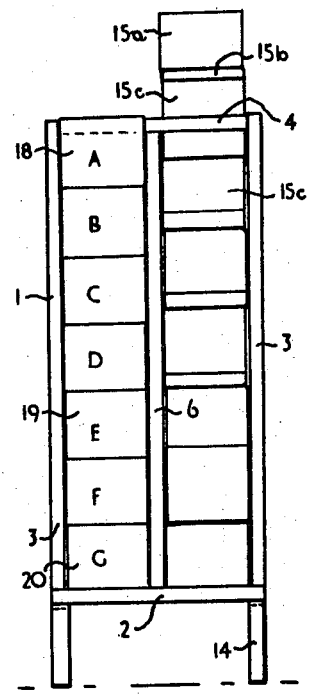
FIG. 2.
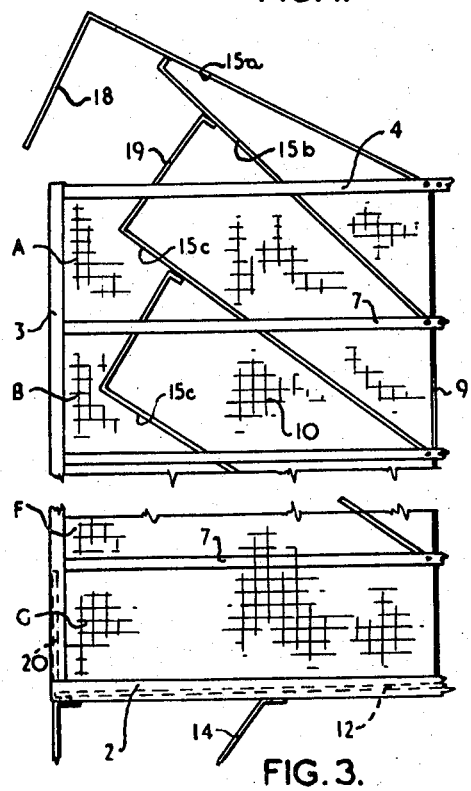
FIG. 3.
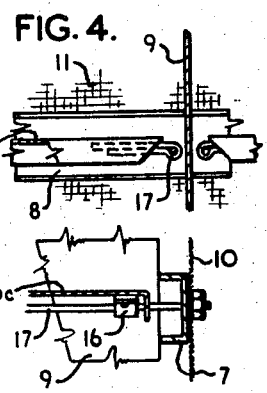
FIG. 4.
FIG. 5.
Inventor
WILLIAM C. FRANK
Attorney

POULTRY CRATES

This invention relates to improvements in poultry crates and appertains particularly to a plurality of crates or cages assembled in a stack that can be conveniently used and transported as a unit.

Heretofore it has been common practice to transport poultry in single crates, approximately 2 feet wide and 3 feet long with a door located in the middle of the top. Filling, loading, transporting, unloading and emptying these crates, that were handled individually, was slow, tedious and arduous work.

It is an object of the present invention to provide poultry crates of any desired number and size assembled in a unit that can be easily moved on a dolly along the aisles of a poultry house and loaded onto or unloaded from a truck trailer, by a lift carried by the vehicle, such units facilitating and speeding up large volume in-and-out movements of poultry.

A further object of the invention is to provide a stack of crates each of which is accessible in succession from bottom to top for filling and from top to bottom for emptying; two of such stacks being combinable in back-to-back relation or multiples of such double back-to-back stacks being assemblable in a single unit.

A still further object is to provide a stack or battery of poultry crates wherein each crate in a stack is accessible from the top thereof at one end by the upward hinging of the crate's lid.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

In the drawings:

FIG. 1 is a side elevation of a multi-stack unit of poultry cages;

FIG. 2 is an end elevation thereof;

FIG. 3 is an enlarged side elevation detail of one end of a stack, with parts broken away;

FIG. 4 is a much enlarged sectional elevation detail showing the hinged mounting of the inner end of a cage lid; and FIG. 5 is a transverse sectional elevation of the lid's hinged mounting.

In the illustrated embodiment, the multi-stack poultry crate unit is seven decks high, with two juxtaposed, double-ended or tandem arrangements of crates, providing in effect 28 individual crates or compartments approximately 12 inches wide, 8 inches high and 22 inches long, 14 of such crates being accessible from each end of the unit.

The assembled unit includes a frame 1 having a rigid horizontal, rectangular base 2, corner posts 3, and a top frame rectangle 4, all formed of inwardly facing angles. At each end a vertical median strip 6 reaches from the frame base 2 to the frame top 4. Along each side of the unit, marking the decks between the base 2 and top 4 are horizontal inwardly facing channels 7 running between the corner posts 3, confronted by similar channels 8, at registering levels, that are affixed at opposite ends to the vertical median strips 6. The median channels 8 are in pairs in spaced back-to-back relation.

As the crates or compartments of the present embodiment are arranged in double-ended or tandem form, a transversely disposed vertical sheet 9 divides the compartments at one end from those at the other and serves as the back or inner wall for each of the 28 crates. The outer side walls 10 and the vertical longitudinal dividing wall 11 between the juxtaposed double-ended stacks are all constructed of wire screen, the former lying outside the horizontal deck defining channels 7 and the latter between the spaced back-to-back pairs of channels 8.

The floor 12 of the bottom cages may be a single sheet supported on the inturned bottom flanges of the frame base angle 2 while the unit, when not on a wheeled dolly, normally rests on its own four metal strip legs 14 mounted on the under of the frame base 2.

While ordinary single crates usually have a door located centrally in the top, this is not feasible when a number of crates are permanently connected in a stack neither is it desired to have horizontally swinging doors in the side of the crates as is sometimes done when crates are stacked as these are not convenient for loading or unloading as a battery of crates is moved along the aisles of a poultry house. Accordingly, the crates of the present stack unit are provided with hinged lids that afford access to the interior of the individual crates through the top thereof and further allow of the easy filling or emptying of the crates from the end rather than the side.

In the illustrated embodiment of my battery unit, it will be noted that lid 15a of the top cage A, in each stack, differs from lid 15b of the second topmost cage B and both are different from the lids 15c that are common to all the succeeding cages C, D, E, F and G to the bottom of the stack. Each lid is approximately the full size of the cage, covering substantially the entire top, and is hingedly mounted as by a strap hinge 16 on a transverse rod 17 extending transversely of the cage at the rear or inner end between the spaced confronting channels 7 and 8, as is shown in FIGS. 4 and 5, the rods 17 being located just short or forwardly of the transverse vertical divider sheet 9.

The top cage lid 15a has a panel section 18 that depends at right angles and serves as the front of cage A. In closed position this lid rests on the frame top channel 4. Lid 15b of the second-from-the-top cage B doubles as the bottom of cage A but does not have any cage front panel on its forward end. Lids 15c for each of the five remaining cages, extending to and including the bottom most cage, each has a panel section 19 at its forward end rising at a right angle and providing the front for the cage above. The front 20 of bottom cage G may be fixed or permanent as there is no need for it to be movable. In closed position, each lid is supported by the front of the underlying cage, except for lid 15a already specifically mentioned.

When lid 15a of top cage A is lifted, access is afforded through the open top of the cage but because of its integral panel 18, the whole front of the cage is open whereby the top cage can be emptied or filled through the open front which is especially convenient at the shoulder height level of cage A. Next, because all the lids are aligned in vertical registry, the no-front lid 15b of cage B can be raised until it engages the underside of opened lid 15a and cage B is readily accessible. As succeeding cage lids 15c are raised, each with its integral panel serving as the front of the superposing cage, they contact the underside of the last raised lids respectively. Conversely, to fill the cages, all the lids are raised and the bottom cage G with its permanent front is loaded first and its lid 15c is lowered into closed position leaving cage F ready for filling, and so on cage by cage to the top of the stack.

The juxtaposed stacks on opposite sides of this unit are the same as are also the stacks at opposite ends of this tandem arrangement except that they face in opposite directions so that in any multiple stack arrangement access to the cages of the respective stack is afforded through the top at the front of the cage.

From the foregoing description taken in connection with the accompanying drawings, it will be manifest that a poultry crate is provided that will fulfil all the necessary requirements of such a device, but many changes could be made in the above description and many apparently widely different embodiments of the invention may be constructed within the scope of the appended claims.

What is claimed is:

1. A plurality of poultry cages permanently connected in a vertical stack, each cage having a hinged lid affording access to the cage interior through the top thereof, whereby the cages may be filled successively from the bottom to the top of the stack and emptied successively from the top to the bottom, wherein the lid of the topmost cage in the stack has a depending panel at its forward end that serves as the front of the cage, the lid of the cage next below has no front panel and the lids of each succeeding cage to the bottom of the stack have each an upstanding panel that serves as a front for the cage immediately above, respectively.

2. A stack of poultry cages according to claim 1, wherein the lid covers substantially the full area of the cage, being hinged at the rear of the cage and opens upwardly to afford full access to the entire area of the cage through the top at the front end of the cage, such afforded access to each cage, excepting only the topmost one, being via the opened front of the cage immediately above.

3. A stack of poultry cages according to claim 1 wherein each lid in closed position is supported at its forward end by the front of the cage immediately below, excepting only the lid of the topmost cage.

* * * * *